Feb. 13, 1945.    M. S. BAKER    2,369,126
POWER TRANSMISSION
Original Filed Sept. 16, 1938    2 Sheets-Sheet 2

Inventor
Malvern S. Baker
Blackmore, Spencer & Flint
Attorney

Patented Feb. 13, 1945

2,369,126

UNITED STATES PATENT OFFICE 2,369,126

POWER TRANSMISSION

Malvern S. Baker, Pontiac, Mich., assignor, by mesne assignments, to General Motors Corporation, Detroit, Mich., a corporation of Delaware Original application September 16, 1938, Serial No. 230,288. Divided and this application March 3, 1939, Serial No. 259,665

6 Claims. (Cl. 74—189.5)

The present invention relates to power transmission systems, more particularly to those forms in which the drive is alternately provided through a reduction speed ratio path or a direct driving path, by alternate engagement of two clutch devices, as shown in my application S. N. 230,288, filed September 16, 1938, of which the present application is a division.

It relates in particular to a form of drive in which the customary engine clutch is dispensed with, and the engine shaft is coupled directly with a vehicle load shaft through a positive jaw clutch, for direct drive therebetween. The elimination of the inertias of main clutch driven members is a necessary concomitant of my new driving system, by which shockless transition between reduction gear drive and direct drive is accomplished.

The invention relates specifically to a form of positive direct drive clutch between the engine shaft and the load shaft, having means for permitting and preventing mesh according to synchronous or asynchronous speeds of the shafts, the mesh blocking means being under constant load during the asynchronous speed interval, and arranged to perform the mesh permitting and preventing action for overtaking speeds by either shaft. In the present disclosure the blocking means includes full mesh blocking teeth meeting at flat angles.

The principal object of the invention is to provide in a new and improved transmission system a synchronism-responsive clutch for coupling transmission elements, adapted to provide certain mesh at synchronous speeds of said elements, with advantages as herein enumerated.

A further object of the invention is to apply the self-acting clutch above described in the novel structure which eliminates the vehicle main clutch, as heretofore stated, wherein the said shockless shift between infinitely variable reduction speed drive and positive direct drive are obtained.

The invention employs as a further object the arrangement of control which includes external loading means for the positive direct drive clutch arranged for cooperation with forces generated by the mesh preventing means, so that the constant loading action aforesaid, of the mesh blocking means creates therewith a cooperative, preset response, whereby, when synchronous speed is attained between the members of the positive clutch, the external loading means proceeds to expend its force to complete the meshing action.

The advantages suggested by these objects are manifold, the simplicity attained by the reduction in the number of parts and the operations for performing the required movements over similar mechanisms heretofore available in this art being a principal one.

The further advantages in the described arrangement of controls wherein an operator by a single application of the force from a single external means may alternate the drive, as aforesaid between reduction and direct, are of unique value.

While the demonstration herewith is of a transversely mounted drive embodying a fluid torque converter, contributing to an angle drive, as for a motor bus, with clutches alternating the forward drive between the torque converter and the direct clutching means, the showing is illustrative, the arrangement lending itself to other forms of drive wherein the reduction speed paths may be provided by friction, inertia, step gear and hydraulic drives of various types.

Other and further important objects and advantages of this invention will be apparent from the following specification, and subjoined drawings, in which.

Figures 3, 4:
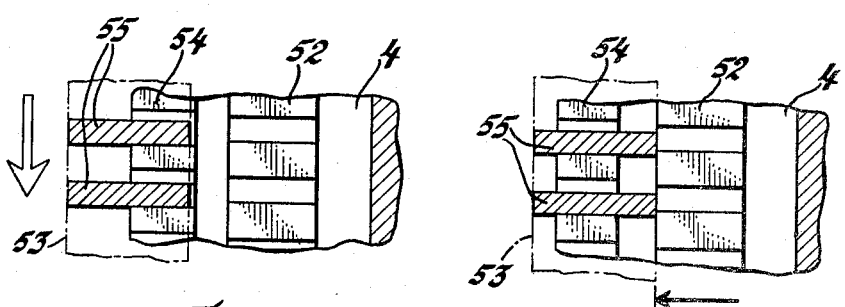
Figure 5:
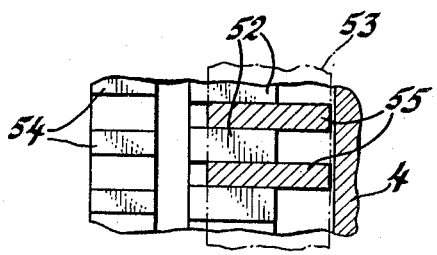

Figures 3, 4 and 5 represent developments of the direct drive clutch teeth and the flat angle relationships of the teeth of the blocking means thereto for different conditions of drive. Fig. 3 shows the relationship of the teeth at the beginning of a meshing interval; Fig. 4 shows them at the blocking point, and Fig. 5 the final mesh relationship after synchronism has been established.

The general arrangement of parts, described by units in the present demonstration, to facilitate study, is as follows: E designates the vehicle engine; C the friction clutch connecting the engine to the input shaft of the fluid torque converter unit T which provides reduction speed drive; F, the freewheel clutch which transmits forward drive from the converter unit to the output shaft; R, the reverse gearing unit which enables the operator also to establish forward and reverse speed; and D the direct drive clutch which is alternately operated with clutch C for direct or for reduction drive.

Figure 1:
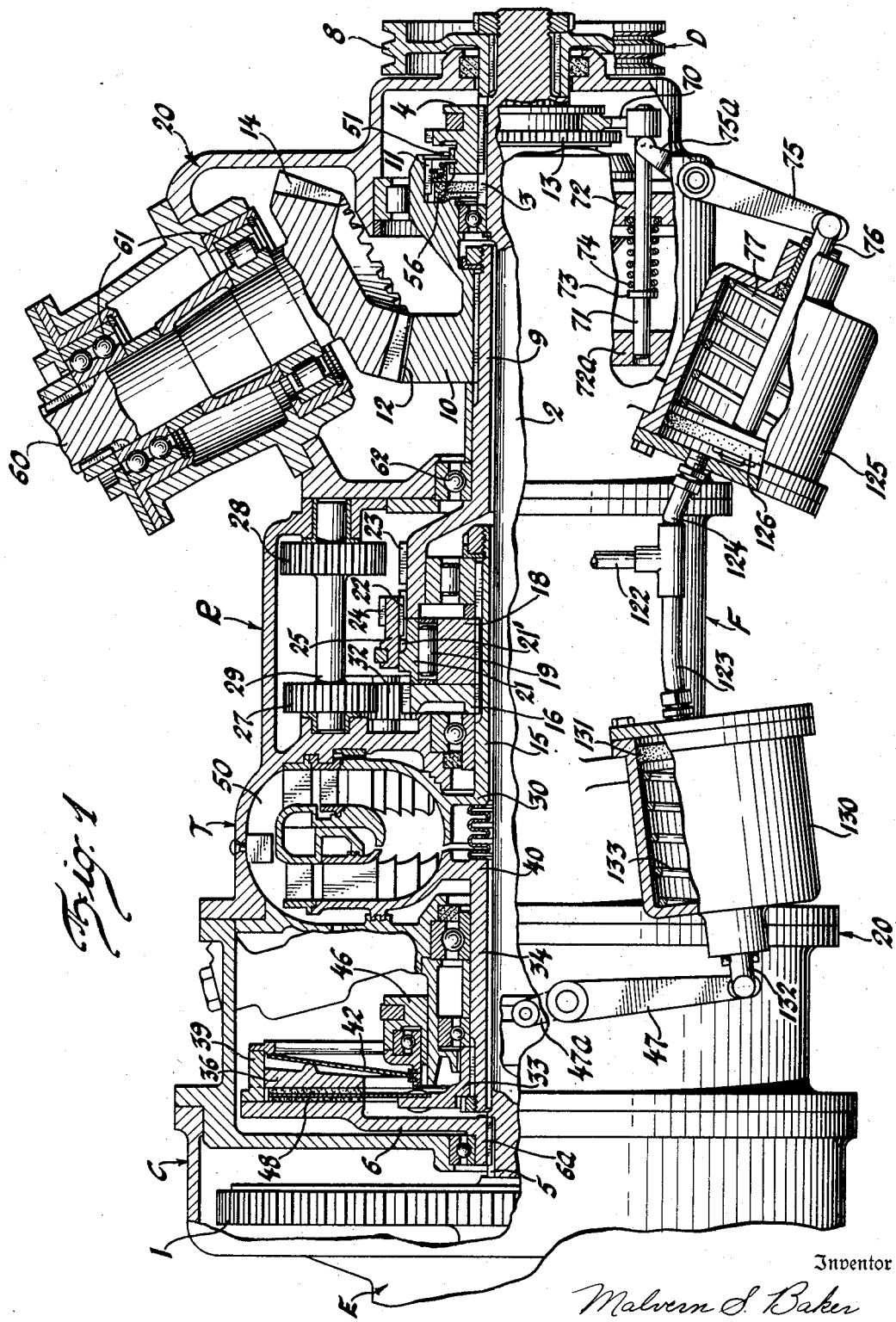
Figure 1 is an elevation, in part section, of a transmission power plant assembly mounted transversely in a motor vehicle, the final drive being through bevel gearing to an angle-drive shaft connected in the well-known manner to the vehicle differential gearing and the driving wheels. The figure shows the external control devices for operating the clutches of the invention.

The primary power plant comprises an engine E of internal combustion type, the flywheel 1 of which is shown at the left of Fig. 1; shaft 2 being affixed to rotate directly with flywheel 1 and the engine, extending through the transmission assembly to flange fitting 8 for driving the air compressor and other accessory groups.

Shaft 2 is splined at 5 to accommodate clutch hub 6a of drum 6 of clutch C, and splined at 3 to accommodate slider 4 of clutch D.

Sleeve 9 surrounding shaft 2 carries affixed bevel gear body 10 having internal ring of teeth 11, and external bevel teeth 12. Slider 4 is formed into ring of teeth 13 which mate with teeth 11, to drive member 10 at engine speed. Output jackshaft 60 mounted diagonally in bearings 61 in casing 20 is fixed to or integral with bevel gear 14 constantly meshed with bevel gear 12, transmitting the drive of sleeve 9 to the driving wheels of the vehicle, through differential gear (not shown).

Sleeve 15 likewise surrounds shaft 2, concentric wth sleeve 9, and carries affixed gear 16 and roller clutch race 18 of clutch F, its leftward end terminating in turbine element 30, the output member of the turbo torque converter T.

At the left clutch drum 6 of hub 6a, rotates with the engine, and carries on overhanging flange 39 supporting a presser plate 36 operated by a disc spring 42 held at its outer periphery in flange 39, and restrained to move at its inner radial edges with collar 46 shifted by external fork 47a.

Shaft 34 surrounding shaft 2 is splined to clutch driven member 33 carrying plates 48, and is integral with, or fixed to the impeller 40 of the converter unit T. When fork 47a is shifted to the left, disc spring 42 loads plate 36, gripping plates 48, and transmitting engine torque to impeller 40 of the turbine. When fork 47a is shifted to the right as in Figure 1, the clutch C is unloaded. Fork 47a is connected to lever 47 pivoted on casing 20, the lever 47 being pivoted to piston rod 132 of piston 131 in cylinder 130, attached to casing 20. Spring 133 normally loads piston, and lever 47 occupies the counterclockwise position of Figure 1, with disc spring 42 thereby rendered active to load plate 36.

Fluid pressure pipes 122 and 123 may deliver pressure to piston 131, overcoming spring 133, rocking lever 47 clockwise to unload clutch C. The further utility of the fluid pressure system is discussed in detail later in this specification. The normal conditions of the mechanical system of clutch C is for clutch engagement.

The torque converter unit T has three elements, an input impeller 40, an output rotor 30 and a set of fixed reaction blades 50. When torque is applied to the impeller within a designed speed range, the output rotor runs at diminished speed, but with increased torque, as is well-known in the fluid turbine art applied to variable speed drives at infinitely variable speed ratios. The present invention is not concerned with the fluid turbo torque converter per se; except insofar as the elements of the invention cooperate to yield a new result therewith.

Sleeve 9 is steadied on casing 20 by bearing 62 and has external ring of teeth 23 engaging internal teeth 22 of slider 25, which also engage teeth 21' of roller clutch member 21, the rollers 19, race 18 and member 21 constituting the one-way clutch F which overruns and permits the turbine driver member 30 to idle when shaft 2 and clutch D are delivering the torque of engine E direct to output, or shaft 60. When slider 25 is shifted from the forward drive position shown in Fig. 1 to mesh with teeth 23 of sleeve 9, the drive will be in reverse.

This is attained by the gearing R consisting of reverse idler gear 32 constantly meshed with gear 16 of sleeve 15, and with gear 27 of countershaft 29, the gear 28 meshing with teeth 24 of slider 25 when the slider teeth 22 drive teeth 23 of sleeve 9. Under these circumstances, the drive from the engine E passes through clutch C, the fluid turbo converter unit T, from member 30 to gear 16, gears 32, 27, 28 and 24 to sleeve 9, which being constantly coupled by gears 12—14, drives shaft 60 in reverse, as will be understood from the form of gear transfer described. Roller clutch F idles when drive is in reverse.

Figure 2:
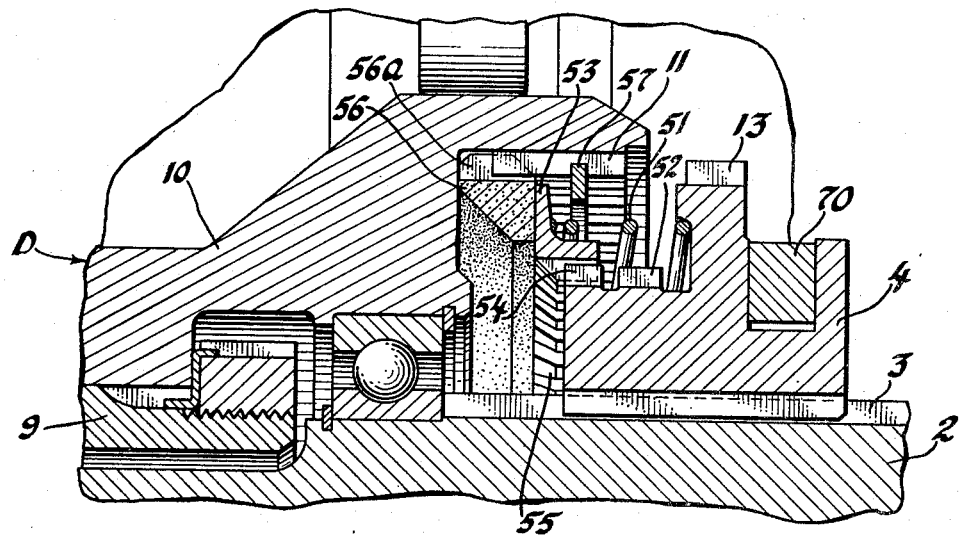
Figure 2 is an enlarged view of the direct drive clutch of Figure 1 in section, showing the elements involved in establishing the mesh rejection and mesh permitting functions of the direct drive control device.

In Figure 2 the detail of the direct drive clutch D of Figure 1 is given. Friction ring 56 made of bronze or equivalent friction metal, is externally toothed at 56a to mesh with the internal teeth 11 of member 10, and presents a radial friction face engaging the face of ring 53 splined internally at 55 to teeth 54 of slider 4. Lock ring 57 inserted in a groove cut across teeth 11 prevents ring 53 from moving beyond the spacing limit shown.

The second ring of teeth 52 is located longitudinally with respect to teeth 54, and the mesh point of teeth 13—11 so that when the position of ring 53 permits free entry of teeth 55—52, the mesh of teeth 13 with teeth 11 will begin.

Spring 51 bears longitudinally against the flank of the radial projection of slider 4 for teeth 13, and against the adjacent portion of ring 53, applying constant load to ring 53, for pressing against bronze-friction ring 56 rotating with body 10.

The force of spring 51 is calculated to apply a predetermined constant load so that ring 53 will never be free to shake into a position other than determined by the differential friction between it and ring 56, as called for by the differential rotations of shafts 2 and 9.

In the splining of ring 53, upon teeth 54 of slider 4, the description herewith shows the tooth spacing of teeth 54 in alignment with the spacing of teeth 52, but wider, so that when the facing flat radial faces of the teeth 55—54 are in abutment, because of differential rotation and because of the friction drag on ring 53, the spacing difference enables the teeth 55 of ring 53 to seat longitudinally against teeth 52 and thus positively balk the longitudinal movement of ring 53 while the differential rotation persists. When this balking action occurs, slider 4 cannot shift far enough to engage its teeth 13 with teeth 11 of body 10.

The small figures 3, 4 and 5 show developments of the stages of mesh blocking and permitting afforded by the interaction of teeth 55 of ring 53, and teeth 52 and 54 of slider 4.

In Figure 3 slider 4 is assumed to be loaded to the left for engaging its teeth 13 with teeth 11 of body 10. Shaft 2 is assumed to have right-hand rotation when viewed from the left of Fig. 2. Ring 53 evidenced by teeth 55 of Figure 3 is advanced with respect to teeth 54.

It will be apparent to one skilled in the art, that the rotational component applied to ring 53 and its spline teeth 55 by drag from ring 56 of body 10 is derived from a fastener rotation of body 10 with respect to shaft 2 and slider 4. The open arrow at the left of Fig. 3 indicates the hand of rotation, and the direction of drag.

Now if body 10 is rotating faster than shaft 2, teeth 11 will be moving at faster peripheral velocity than teeth 13 of slider 4, therefore it is desirable to block the entry of these teeth until synchronous speed is attained.

In Figure 4, as indicated by the black arrow, the meshing motion of slider 4 has stopped, and although its load is still being exerted, the teeth 55 of ring 53 have balked at a flat angle against the ends of teeth 52 of slider 4. As will be described later, the loading force applied to mesh the slider teeth 13 is never great enough to overcome the rejection force by which ring 53 blocks the longitudinal travel, until the rejection force disappears.

Having been given the face friction areas of rings 53—56, the load of spring 51 and whatever chamfer or camming angle the designer may use for the abutting teeth 55 and 52, it is a simple matter for one acquainted with such mechanisms to select the proper loading force for the total mesh movement of slider 4.

Now when synchronism between shafts 2 and 9 is reached, by whatever control means, the directional force which before tended to rock ring 53 into blocking position falls off to zero, since the differential of speed has fallen off to zero. As far as the blocking mechanism is concerned, the small differential drag also falls off to zero, and the external force applied to slider 4 through fork 70 is capable of pushing teeth 52 on past teeth of ring 55, which also brings teeth 13 into engagement with teeth 11, by virtue of their longitudinal spacing.

The preloading for mesh of slider 4 has a valuable characteristic which is believed worthy of emphasis. If the device were to wait to dwell until the rotating parts had gone through zero differential, or past synchronism, an undesirable skip of mesh would occur, as teeth 13—11 tried to come to engagement. Such action is undesirable, but it does prevent shock-loading, and the operator is warned by the racing of the engine, and simply reduces the throttle to resynchronize the engine.

This point is of unusual importance when it is remembered that there is no friction clutch in the path of torque between the engine and the load shaft 60, when clutch D is engaged, so that no absorption of torque shock can occur, as in vehicles having main clutches between engine and driving mechanism. The combination of the above described balking action of ring 53 with its constant preload, and the predetermined loading force for the slider mesh movement is believed novel in this art, and of exceptional utility in drives wherein the customary main clutch is eliminated, as described herewith.

The external loading mechanism for slider 4 consists of fork 70 attached to rod 71 as shown at the right in Fig. 1, the rod being mounted in extensions 72 and 72a of casing 20 to slide freely. The eye end of fork 70 where it is attached to rod 71 affords bearing for the one-way motion of cam arm 75a, of lever 75 pivoted in casing 20. Loading spring 74 seats against stop ring 73 of rod 71 and against portion 72 of casing 20, exerting a predetermined force tending to shift rod 71 to the left, to apply a mesh-engaging force to slider 4.

The demeshing force for slider 4 is only supplied by rotation of lever 75 about its pivot, the cam arm 75a overcoming spring 74 which otherwise may hold slider 4 in meshed position. In order to arrange the controls for ease of operation, it is desirable to superimpose a further control biasing mechanism upon the slider device so that the normal condition of clutch D is "disengaged." This is accomplished by spring 77 recessed in cylinder 125 attached to the casing 20. Piston 126 slides in cylinder 125, its rod 75 being pivoted to lever 75. Fluid pressure may be applied through pipe 122 and pipe 124 to piston 126, overcoming spring 77, allowing spring 74 to load the slider 4 for direct engine-to-loadshaft engagement, whereupon the mesh prevention action described above, and the synchronous engagement action takes place. When the fluid pressure is removed, the spring 77 shifts the slider 4 to demeshed position, clutch D being then disengaged.

The operator of the vehicle need only manipulate a single valve controlling solely the fluid presure to pipe 122, admitting fluid when direct drive is desired, and releasing it when direct drive is to be uncoupled.

Pipe 122 also feeds cylinder 133 attached to casing 20, the piston 131 shifting to the left against the action of spring 133 to rock lever 47 for disengaging clutch C, so that the torque converter unit may idle, when the direct drive clutch D is loaded for engagement. It will be seen that an advantage is derived from the common fluid pressure actuation and control by the presence or absence of fluid pressure in pipe 122, for both clutches C and D. When the fluid pressure is removed, spring 133 of cylinder 130 shifts piston 131 to the rightward end of its stroke, swinging lever 47 counterclockwise, and shifting collar 46 to load clutch C for engagement. The releasing action of clutch D, is assisted by the operator diminishing the throttle setting of the engine speed control which reduces the torque carried on the flat sides of teeth 13—11 of clutch D. As soon as the value of torque on these teeth falls below a given minimum, spring 77 through the linkage 75—75a—70, rocks lever 75 clockwise, the cam arm 75a applying a mechanical advantage, multiplying the effort of spring 77 upon slider fork 70, which thrusts slider 4 to the right, releasing jaw teeth 13 from teeth 11 of body 10. This action takes place very quickly.

In applying the fluid pressure to cylinders 125—130 to move pistons 131—126, for establishing direct drive, no particular technique in sequential motion of the levers 47—75 is needed. If the operator is running with full throttle when the control valve for pipe 122 is opened, the relative speed interval between shafts 2 and 9 will be very small so that a slight diminishing of the operator's throttle pedal setting will suffice to bring down shaft 2 to a speed equal to that of shaft 9 when synchronous speed engagement of clutch D would occur. An inexperienced driver soon learns to move the engine accelerator pedal so as to facilitate, or speed up the shift interval, just as drivers of cars equipped with standard transmissions do today.

This form of control relieves the driver of the responsibility for shifting gears to a number of positions, since the master control for pipe 122 or its equivalent need only be a single member. The operator may shift from drive through clutch C to drive through clutch D at any time, and vice versa.

A single valve control of general form such as described in U. S. 2,272,434 to Hans Schjolin, filed February 9, 1938, may be utilized to control the fluid pressure in pipe 122.

The complete operating cycle described above is to clearly outline the utility of the invention in every detail. While fluid pressure is described for operating the controls, it seems obvious that a purely mechanical force applied to levers 75 or 47 may be used within the purview of the invention. Instead of fluid pressure, mechanical connections of common sort may be used to shift rod 76 against spring 77, and likewise for rod 132 and spring 133 except as overall controls are described in combination for the reasons cited above.

In the overall operation, the operator, while slider 25 is in the forward driving position of Fig. 1, may select converter or direct drive at will by manipulating whatever control is used to alternate drive through clutch C or clutch D, without care as to the possibility of clash of clutch D, because of the unique mechanism of the present invention. It should be borne in mind that the mesh blocking action of ring 53 and teeth 55 with teeth 52 will take place whether or not shaft 9 or shaft 2 is the faster at the time of release of clutch C and the loading of clutch D for engagement, since if ring 53 is rocked in the reverse direction to the arrow of Fig. 3, the upper portions of teeth 55—52 will block instead of the lower ones described in the foregoing demonstration. The subsequent vanishing of rejection force at synchronism will occur, as described previously, the only difference being the approach to centering in the tooth spaces of teeth 54 by the teeth 55 from the opposite hand of rotation, the spring 51 continuing to apply its constant preload force.

The shifter control for the motion of slider 25 may be of common construction, as shown in the aforesaid U. S. Patent 2,272,434, filed February 9, 1938, operated from a distance by ordinary rodding and linkages from the vehicle driver's station.

The invention described herewith is believed to constitute a novel contribution to the art of vehicle drive controls whereby economy in the number of parts is had by the elimination of the main clutch; wherein the engine and load shafts are directly coupled by a special form of self-synchronizing jaw clutch providing positive blocking abutment and engagement without shock, and wherein the positive clutch mechanism is constantly pre-loaded for establishing a synchronous rejection of mesh, while being externally loaded by a carefully predetermined loading means incapable of overcoming the mesh rejection force until synchronism. It is believed of further novelty to bias the clutch control mechanism as herewith demonstrated; and to provide sequential alternation of drive through a common control means.

While I have pointed out in the above specifications certain novel features of my invention, it will be understood that various omissions, substitutions and changes in the form and details of my device illustrated in the annexed drawings, and in the operation may be made by those skilled in the art without departing from the spirit of the invention.

Having thus described my invention, I claim:

1. In power transmission devices, in combination, an engine, an engine shaft, a load shaft driving at an angle to said engine shaft, and adapted to be coupled thereto at a point remote from said engine, a rotatable gear, concentric with said engine shaft, a gear fixed to said load shaft and meshing with said first gear, a ring of positive clutch jaws formed on said first named gear, a sliding jaw member having jaws mating with those of said ring mating with said positive clutch jaws, a friction element rotating with said first named clutch jaws, a mating friction element splined on said slider constantly loaded to engage said first named friction element and having flat angle abutment teeth, and a ring of teeth cut on said slider having mating flat abutment teeth adapted to be blocked by said second named element when said mating clutch jaws and said member rotate at dissimilar speeds, thereby preventing longitudinal motion of said slider, and adapted to permit such motion when the said speeds are equal.

2. In power transmission controls, an engine, an engine shaft, a load shaft, an intermediate shaft concentric with said engine shaft and coupled to drive said load shaft by a concentric bevel gear and a mating bevel gear fixed to said load shaft, and located at a point remote from said engine, a fluid torque converter, a one-way roller clutch, a friction clutch adapted to couple said engine with said concentric bevel gear through said torque converter, said roller clutch and said intermediate shaft; a direct drive clutch arranged to couple said engine shaft with said intermediate shaft when said friction clutch is disengaged comprising clutch jaws formed on said concentric bevel gear, a slider having clutch jaws mating therewith equipped with flat angle blocking teeth and rotating with said engine shaft; a control for said slider, a friction balking mechanism having flat angle teeth adapted to coact with said first named teeth to prevent mesh of said clutch jaws at dissimilar speeds, constantly acting loading means for said mechanism, a biasing means for said clutch control constantly active to preload said slider for engagement of said jaws, and operator controlled means for said control adapted to prevent or permit said biasing means from acting, while alternately engaging or disengaging said friction clutch.

3. In motor vehicles, an engine-connected shaft, an intermediate shaft, a load shaft, a final drive shaft, a friction clutch and a variable speed drive connected in series between said first two named shafts, clutching means between said intermediate and load shafts for coupling and uncoupling normal forward drive therebetween, a shifter for said clutching means, a gear fixed to said load shaft having teeth constantly meshed with a second gear fixed to said final drive shaft, a clutch device adapted to connect for unitary rotation said first named and said load shafts consisting of mating jaw clutch members one of which is formed on said first named gear, the other rotating with engine connected shaft, shifting means for one of said members operative to engage and disengage them, blocking means including flat angle abutment teeth effective to prevent engagement thereof when said members rotate at non-synchronous speeds, a constantly loaded friction element having mating flat angle teeth and adapted to bias said blocking means in blocking relation, actuation means for said clutch shifter and said shifting means, and a common control simultaneously operative upon said actuation means for said first named friction clutch and said shifting means operative to preset the shifting means for engagement when said friction clutch is being disengaged, said control including fluid pressure motors for each of said clutches and said shifting means supplied by a single pressure feed line.

4. In a combination such as described in claim 3, the sub-combination of preloading means made effective to establish engagement motion of said shifting means while said clutch is being disengaged by the said fluid pressure.

5. In a combination such as described in claim 3, the sub-combination in said common control system of a movable stop normally positioned to inhibit engaging force from moving said shifting means, which movable stop is removed to permit the action of said engaging force while said clutch is being disengaged by the said fluid pressure.

6. In motor vehicle controls, in combination, a power shaft, a load shaft, driving mechanism therebetween including a first path of torque between said shafts embodying a friction clutch, a turbo torque converter, a coupling device and a one-way clutch; a second path of torque including a positive jaw clutch, a mesh blocking and permitting device for said jaw clutch consisting of a balking ring having flat angle abutment blocking faces mating with similar faces formed on one member of said clutch, actuating means for said clutches adapted to disengage the said friction clutch while said actuating means is loading the said jaw clutch and said device for engagement, and further adapted to disengage the said jaw clutch before loading the said friction clutch for engagement, biasing means embodied in said actuating means normally effective to load said friction clutch for engagement, said actuating means including power means, and a common energy source for said power means effective when energizing said power means for establishing direct drive by said jaw clutch and when rendered effective to permit the actuating means to establish reduction drive by said friction clutch, whereby the power means actuation is effective to maintain direct drive thru said friction clutch and torque converter.

MALVERN S. BAKER.